Nov. 7, 1944.   E. HAUB   2,362,132
GLASS TRANSFER MECHANISM
Filed March 11, 1942   2 Sheets-Sheet 1

Inventor
Edwin Haub

By
Eccleston & Eccleston
Attorneys

Nov. 7, 1944.  E. HAUB  2,362,132
GLASS TRANSFER MECHANISM
Filed March 11, 1942  2 Sheets-Sheet 2

Inventor
Edwin Haub
By
Eccleston & Eccleston
Attorneys

Patented Nov. 7, 1944

2,362,132

UNITED STATES PATENT OFFICE 2,362,132

GLASS TRANSFER MECHANISM

Edwin Haub, Zanesville, Ohio, assignor to Hazel-Atlas Glass Company, Wheeling, W. Va., a corporation of West Virginia Application March 11, 1942, Serial No. 434,280

2 Claims. (Cl. 198—22)

The invention relates to mechanism by which glassware may be transferred to a conveyer, such as to the cross-conveyer of a glass leer, and one of the objects of the invention is to provide a simple and inexpensive device of this character.

Another object of the invention is to provide a device of this character by which the paddles or other elements which move the glass articles may be rendered ineffective at the desired point, so that the articles can be closely and uniformly arranged on the conveyer.

A further object of the invention is to provide a unitary transfer mechanism which may assume any desired position with respect to leer cross-conveyers.

Various other objects and advantages of the invention will be apparent to those skilled in the art, from the following detailed description when taken in connection with the accompanying drawings, in which, Figure 1 is a perspective view of the apparatus.

Figure 1:
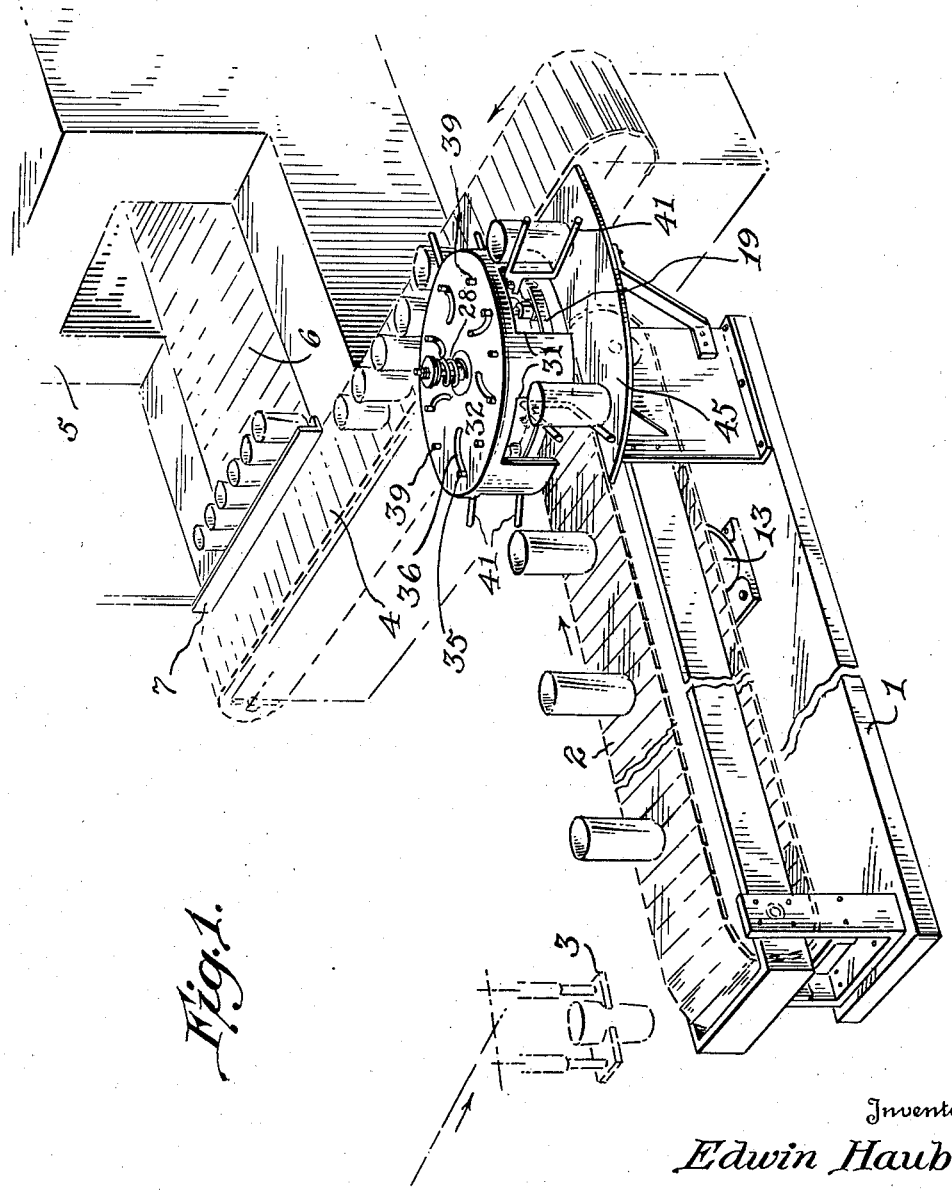

Referring to the drawings in more retail, numeral 1 indicates a base member upon which is mounted a conveyer 2. This conveyer is shown as of the endless belt type, but of course it could be a rotary table or any other form of conveyer.

A take-out device is illustrated diagrammatically in Figure 1, and referred to by numeral 3. The take-out device removes glass articles from the molds of a forming machine and places the articles on the conveyer 2. Of course the articles may be delivered to the conveyer 2 by any desired means, and from a forming machine or any other source.

The articles are shown on the conveyer 2 as rather widely spaced, but when delivered to a leer they should be uniformly and closely spaced. This is accomplished by a transfer wheel which positions the articles on a leer cross-conveyer 4 in the desired uniform closely spaced relation. The cross-conveyer carries the articles into position in front of a leer 5, whereupon they are swept onto the lower conveyer 6 by any desired form of leer loader 7, usually timed with the forming machine. The transfer wheel will now be described.

Numeral 8 indicates a vertical shaft rotatably mounted in a bracket 9 carried by the frame of conveyer 2. This shaft is continuously rotated by any desired means. In the particular form illustrated a bevel gear 10 is keyed or otherwise fixed to the lower end of shaft 8. Meshing with the bevel gear is a pinion 11, the shaft of which has mounted thereon a sprocket wheel 12.

Numeral 13 indicates a motor which may be mounted on the base member 1 or elsewhere on the frame of conveyer 2. This motor, which is preferably synchronized with a motor driving the glass forming machine (not shown), drives a sprocket wheel 14. Numerals 15 and 16 refer to a double sprocket keyed to a shaft mounted on the frame of conveyer 2, and which shaft drives this conveyer. A sprocket chain 17 connects sprocket 14 with sprocket 15, to drive conveyer 2, and a sprocket chain 18 connects sprocket 16 with sprocket 12 to rotate the vertical shaft 8. As previously mentioned, any other desirable means may be employed for driving the conveyer 2 and for rotating the shaft 8.

Numeral 19 refers to a stationary cam having a cam track 20. This cam is mounted on the bracket 9 and is rotatably adjustable thereabout to any desired position. For securing the cam in its properly adjusted position, a set screw 21 in the cam hub engages a continuous groove 22 in the bracket 9.

A disc 23 is carried by the shaft 8 above the cam hub, and the upper surface of the disc is preferably provided with a fiber pad 24. Resting on this pad is the hub 25 of the transfer wheel having spokes 26 and a rim 27. A coil spring 28 presses the wheel hub against the friction pad 24, and the pressure on the pad can be adjusted by nuts 29. Thus the transfer wheel is driven frictionally, so that strain or breakage of parts of the apparatus will not occur if rotation of the wheel should be prevented by jamming or the like.

The rim 27 of the transfer wheel may be protected by a layer of sheet metal 30, and this sheet metal and the rim 27 are provided with openings 31. Of course the number of these openings may vary in different installations; six being shown in the form illustrated. The transfer wheel may also be covered by a plate 32 of sheet metal.

The transfer wheel as shown has six of the spokes 26, and associated with each spoke is a crank 33. Each crank has a roller 34 which rides in the cam track 20; lubrication being provided by oil tubes 35 which extend upwardly through arcuate slots 36 in the cover plate 32.

One arm 37 of each of the cranks is pivotally connected to one of the spokes 26, as indicated by numeral 38; lubrication for these bearings being provided by oil tubes 39 which extend upwardly through openings in the cover plate. The other arm 40, of each crank, carries a sweep or paddle 41. Of course these elements may be of any desired form, and may be varied for different types of ware being handled. In the particular apparatus illustrated the sweeps or paddles 41 are in the form of U-shaped rods having their bases welded to plates 42. These plates are provided with an open-ended slot 43 through which passes a bolt 44 mounted in crank arms 40. Thus by loosening the nuts on the bolts 44 the sweeps or paddles can be easily removed for repair or for replacement by another form of paddle.

Numeral 45 refers to a dead pan which is arranged between the conveyer 2 and the leer cross-conveyer 4. It is preferably supported from the frame of conveyer 2, and the extent of the dead pan employed will depend upon the angular relation between the conveyer 2 and the cross-conveyer 4.

Figure 2:
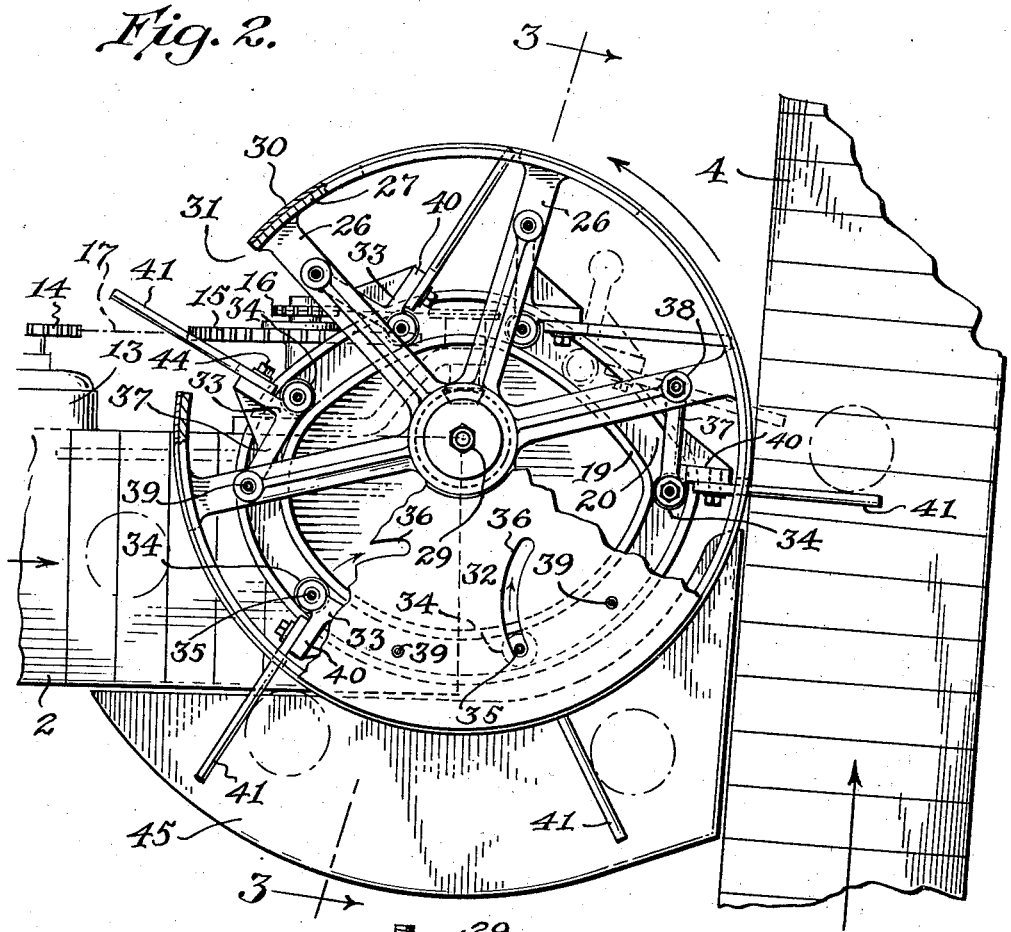
Figure 2 is a plan view of the apparatus, with parts broken away.
Figure 3:
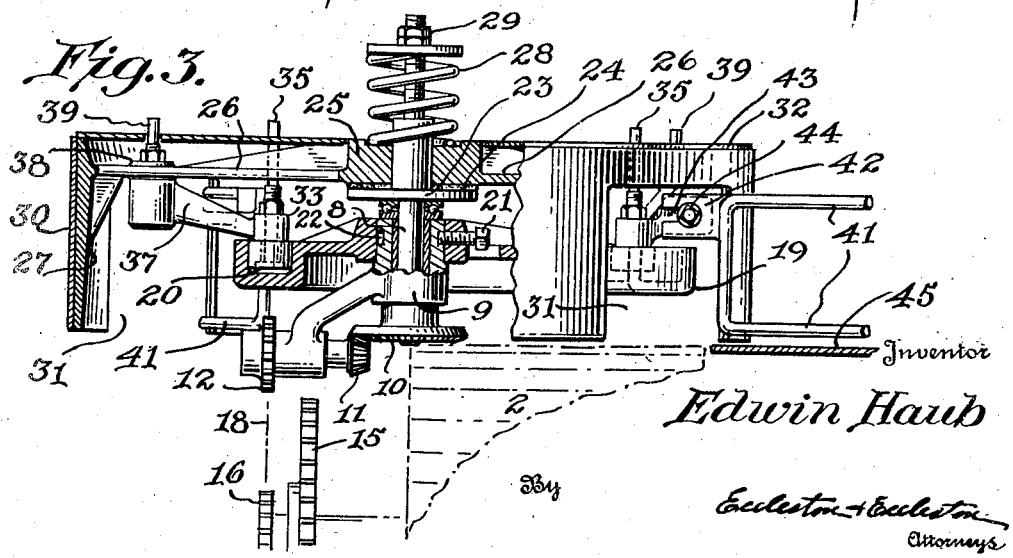
Figure 3 is a vertical sectional view taken on line 3—3 of Figure 2, with parts shown in elevation.

In operation, the glass articles are placed on the conveyer 2 by any desired means and from any source, as by a take-out device 3 which transfers the articles from the molds of a forming machine to the conveyer. This conveyer is driven in the direction indicated by the arrow, by any desired means, but preferably by a motor 13 which is mounted on the base member 1 of the conveyer or elsewhere on the conveyer frame, and which motor is preferably synchronized with a motor which drives the glass forming machine (not shown). The transfer wheel is also rotated by the motor 13, in the direction of the arrow on Figure 2, but of course other means may be employed for driving the transfer wheel.

The glass articles on the conveyer 2 are rather widely spaced, and the parts are so timed that as each article reaches the transfer wheel, one of the sweeps or paddles 41 engages the article and sweeps it from the conveyer 2, across the dead pan 45, and onto the leer cross-conveyer 4. It will be noted that the paddles travel along the cross-conveyer in the direction of travel of the cross-conveyer and hence the articles are carried to an advanced position on this conveyer. When a paddle has carried its article to the desired position on the cross-conveyer the paddle is retracted, so that it no longer has any effect on the article transferred. This successive retraction of the paddles is accomplished by the rollers 34 of the cranks traveling in the cam track 20, and is clearly illustrated in Figure 2 where one of the paddles, partly retracted, is shown in dotted lines. Of course the cam is so designed that the paddles will be successively moved outwardly to operative position as they approach the conveyer 2.

It will be apparent that by moving the articles forwardly on the leer cross-conveyer, and then retracting each paddle when its article has reached the desired advanced position on the cross-conveyer, the articles will be closely and uniformly spaced thereon, and will be in perfect alignment, ready to be swept onto the leer conveyer 6, by the leer loader 7, where the cross-conveyer has carried the closely arranged articles into position in front of the leer.

Of course the articles must be closely arranged on the leer cross-conveyer so as to avoid waste of leer space when they are positioned on the leer conveyer. All of the parts are timed so that the articles will be closely spaced on the leer cross-conveyer when delivered thereto by the transfer wheel.

As previously described the conveyer 2 and transfer wheel are preferably formed as a unitary structure, and are not structurally connected with either the forming machine or the leer, so that the unit may be arranged at the desired angle with relation to the leer cross-conveyer. Glass leers are of great length and are usually arranged in parallel relation, while the glass forming machines are arranged about a glass tank. Hence the desirability of arranging the transfer mechanism at various angles with respect to the leer cross-conveyers.

This is rendered possible, in accordance with the present invention by the adjustability of the cam 19 and by forming the conveyer 2 and transfer wheel as a unit. As these parts are a unitary structure it is of course possible to place the conveyer 2 in any position necessary to lead from the forming machine to the leer cross-conveyer, and it is immaterial at what angle the conveyer 2 approaches the cross-conveyer. Suppose, for example, that by reason of the relation between the positions of the forming machine and leer, it were necessary to swing the rear end of the conveyer 2 to the left or right (Fig. 1). In that event it would only be necessary to loosen set screw 21 and move the cam forward or backward, to the necessary extent, depending upon the direction in which the conveyer was moved and how far it was moved. With the cam thus adjusted, the articles will be delivered to, and will be uniformly and closely positioned on, the cross-conveyer 4, just as hereinbefore described. It will be understood, of course, that when the conveyer 2 is arranged at a different angular relation with the cross-conveyer, it will be necessary to substitute a different dead pan extending between the two conveyers.

The particular apparatus illustrated has been described in considerable detail, but it will be understood that various changes and modifications may be made without departing from the spirit of the invention, and all such changes and modifications are intended to be included within the scope of the appended claims.

What I claim is:

1. An apparatus for transferring glass articles to a leer cross-conveyer and adapted to be arranged at varying angles with respect to the cross-conveyer, including a conveyer, a transfer wheel associated therewith, a plurality of paddles carried by said wheel for successively conveying the articles from the conveyer to the leer cross-conveyer in the direction of travel of the cross-conveyer, means for successively retracting said paddles when the articles have been advanced to the desired position on the cross-conveyer, a motor for driving the conveyer and transfer wheel, said conveyer, transfer wheel and motor constituting a unitary structure independent of the leer cross-conveyer, and means for varying the point of retraction of the paddles in accordance with the variable angular relation between the conveyer and the leer cross-conveyer.

2. An apparatus for transferring glass articles to a leer cross-conveyer and adapted to be arranged at varying angles with respect to the cross-conveyer, including a conveyer, a transfer wheel associated therewith, a plurality of paddles carried by said wheel for successively conveying the articles from the conveyer to the leer cross-conveyer in the direction of travel of the cross-conveyer, a cam for successively retracting said paddles when the articles have been arvanced to the desired position on the cross-conveyer, a motor for driving the conveyer and transfer wheel, said conveyer, transfer wheel and motor constituting a unitary structure independent of the leer cross-conveyer, and means for adjusting said cam to vary the point of retraction of the paddles in accordance with the variable angular relation between the conveyer and the leer cross-conveyer.

EDWIN HAUB.